US010880601B1

(12) United States Patent
Donahoe

(10) Patent No.: US 10,880,601 B1
(45) Date of Patent: Dec. 29, 2020

(54) DYNAMICALLY DETERMINING AUDIENCE RESPONSE TO PRESENTED CONTENT USING A VIDEO FEED

(71) Applicant: Amazon Technologies, Inc., Seattle, WA (US)

(72) Inventor: Sean Donahoe, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 76 days.

(21) Appl. No.: 15/901,084

(22) Filed: Feb. 21, 2018

(51) Int. Cl.
*H04N 21/442* (2011.01)
*H04N 21/44* (2011.01)
*H04N 21/43* (2011.01)

(52) U.S. Cl.
CPC ... *H04N 21/44218* (2013.01); *H04N 21/4302* (2013.01); *H04N 21/44008* (2013.01)

(58) Field of Classification Search
CPC ......... H04N 21/44218; H04N 21/4302; H04N 21/44008
See application file for complete search history.

(56) References Cited

U.S. PATENT DOCUMENTS

| | | | |
|---|---|---|---|
| 2009/0133051 A1* | 5/2009 | Hildreth | H04N 5/4403 725/28 |
| 2010/0070987 A1* | 3/2010 | Amento | H04H 60/33 725/10 |
| 2012/0324492 A1* | 12/2012 | Treadwell, III | H04H 60/66 725/10 |
| 2013/0046577 A1* | 2/2013 | Marci | G06Q 10/10 705/7.29 |
| 2013/0152113 A1* | 6/2013 | Conrad | H04N 21/42201 725/12 |
| 2013/0283162 A1* | 10/2013 | Aronsson | H04N 21/42201 715/719 |
| 2013/0346330 A1* | 12/2013 | Fleischman | G06Q 50/01 705/319 |
| 2014/0086554 A1* | 3/2014 | Yehezkel | H04N 21/8549 386/241 |
| 2014/0354533 A1* | 12/2014 | Swaminathan | G06F 3/013 345/156 |
| 2016/0073054 A1* | 3/2016 | Balasaygun | H04L 12/1813 348/14.08 |
| 2017/0171614 A1* | 6/2017 | el Kaliouby | H04N 21/44218 |
| 2017/0251262 A1* | 8/2017 | Bist | G06F 17/30032 |

(Continued)

*Primary Examiner* — Alexander Q Huerta
(74) *Attorney, Agent, or Firm* — Eversheds Sutherland (US) LLP

(57) ABSTRACT

Systems, methods, and computer-readable media are disclosed for dynamically determining audience response to presented content using a video feed. In one embodiment, an example method may include receiving video data for users to which content is presented over a time period, generating, using the video data, a set of frames corresponding to a first user, wherein the set of frames includes a first frame corresponding to a first time during the time period and a second frame corresponding to a second time during the time period, determining, using the first frame and the second frame, a first engagement value for the first user, determining, using the first frame, a first emotional classification for the first user at the first time, determining, using the second frame, a second emotional classification for the first user at the second time, and determining first aggregate user response data for the first user.

18 Claims, 8 Drawing Sheets

(56) References Cited

U.S. PATENT DOCUMENTS

2017/0295404 A1* 10/2017 Meredith ............ H04N 21/4667
2018/0129902 A1*  5/2018 Li ........................ G06K 9/4671
2018/0205989 A1*  7/2018 Srinivasan ....... H04N 21/44218

* cited by examiner

DYNAMICALLY DETERMINING AUDIENCE RESPONSE TO PRESENTED CONTENT USING A VIDEO FEED

BACKGROUND

Various types of content may be consumed by an audience of users in different contexts. For example, visual and/or auditory performances, such as political speeches, training presentations, artistic performances, or films, may be consumed by an audience of users. The depth of engagement of audience members in the substance or messaging of the presented content may vary throughout the presentation, and different audience members may experience different emotions at various points in time during the presentation. In such instances, it may be difficult for creators, analysts, or performers of the presented content to determine the audience's response to the content or portions thereof.

Figure 1A:
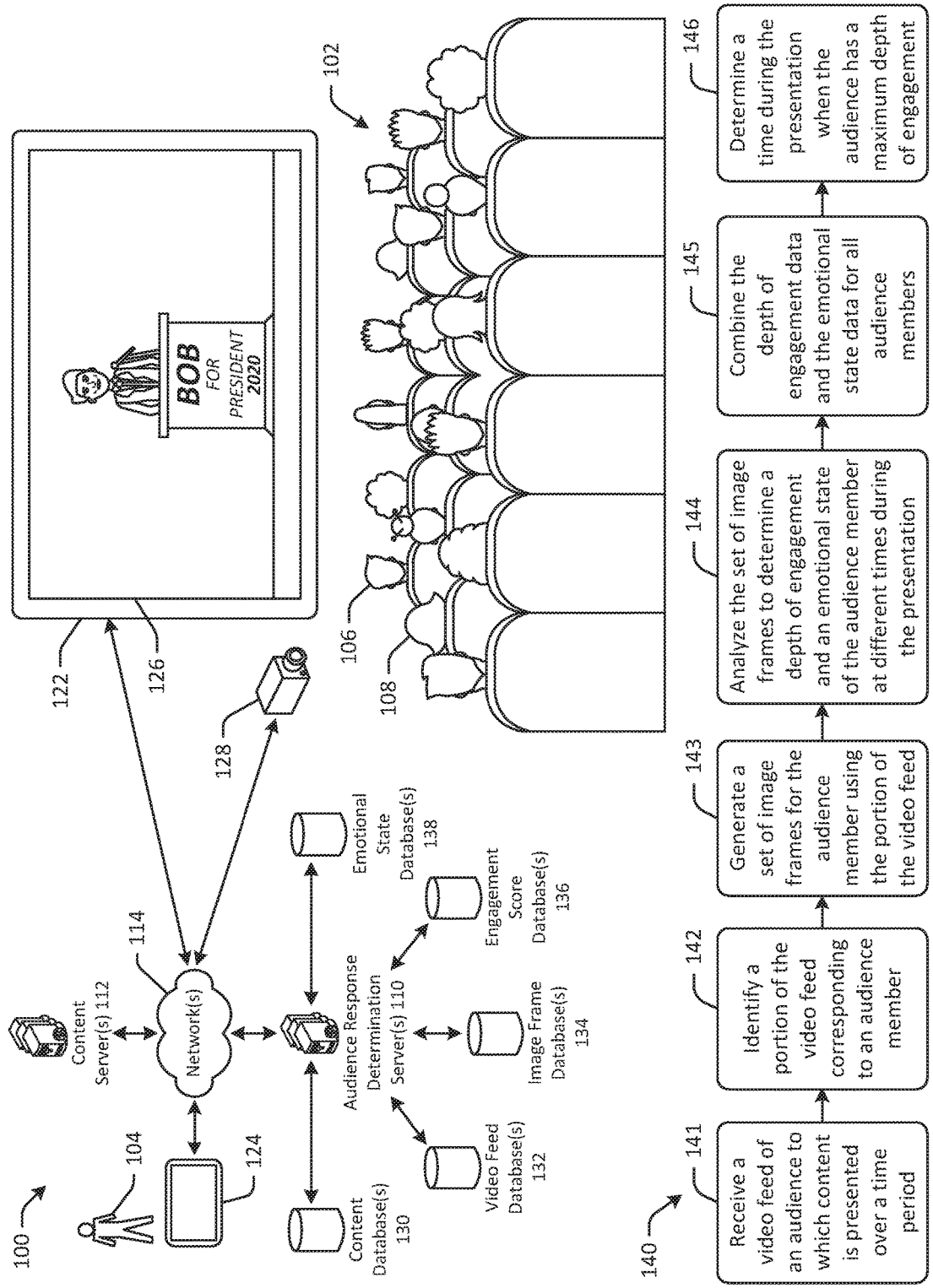
FIG. 1A is a hybrid system and process diagram illustrating dynamically determining audience response to presented content using a video feed in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

A variety of content may be presented to and consumed by an audience of individuals in different contexts. For example, visual and/or auditory performances, such as political speeches, training presentations, artistic performances, films, or other types of content may be presented to and consumed by an audience. Certain audience members may be highly engaged in the substance or messaging of particular content, while other audience members may be less engaged in the substance or messaging of the same content. Moreover, the depth of engagement of a particular audience member in the substance or messaging of the presented content may vary widely throughout the presentation. For example, an audience member may be more engaged when in agreement with the content messaging or intrigued by visual or auditory aspects of the content, but the same audience member may become less engaged when in disagreement with the content messaging or bored by aspects of the content. Additionally, different audience members may experience different emotions at certain points in time during the presentation of particular content. For example, certain audience members may be ecstatic if they fully support the content messaging of a portion of the content, while other audience members may be disgusted by the same content messaging. Further, emotional responses experienced by a particular audience member consuming the content may vary widely throughout the presentation. For example, an audience member may experience happiness during a portion of the presentation, but the same audience member may experience sadness during another portion of the presentation.

Various entities may be interested in determining the response of an audience of individuals to particular content or portions of the content. For example, creators of the content may desire to understand the level of engagement of different audience members at various times during the content presentation and how such engagement may change from one portion to another portion of the content. Content creators also may seek to determine whether audience members consuming a particular portion of the content are experiencing emotional responses that are aligned with or different from those intended by the creators. Such information may be used by content creators in determining modifications to the content or other related content that may be presented to audiences in the future. In certain contexts, content presentations also may be analyzed by various third parties, such as news organizations or critics of a particular industry. Such analysts also may be interested in understanding how audience members respond to presented content in order to determine the newsworthiness, effectiveness, or value of the content. The information determined by content analysts with respect to a particular content presentation may be published or shared with additional parties that are interested in the content. Because additional parties may rely on the information provided by content analysts when making decisions regarding the underlying content, the accuracy of such information may be highly important. As another example, individuals who perform the content may desire to determine how their performance was perceived by the audience and also may consider making changes to aspects of future performances in view of the audience response. Still other entities and individuals may seek to understand audience response to particular content presentations and make decisions based on such understanding.

In the political context, politicians or candidates running for public office may deliver numerous speeches to a variety of audiences throughout a given term or campaign. For each speech, the politician or candidate and his/her campaign team may desire a detailed understanding of how the audience responded to the messaging or other aspects of the speech. Using that information, the politician or political candidate may identify portions of the speech that were well received by audience members and other portions that were not well received by audience members. Moreover, such information may be used by the politician or candidate in preparing future speeches to be delivered to audiences having a similar or different make up of individuals. News organizations also may be interested in determining audience response to a speech in order to report their analysis to individuals who may or may not have listened to the speech. One approach for determining audience response to a speech or other similar presentation is to use a test audience, with one or more, or each, audience member controlling a dial to provide feedback throughout the presentation. The audience member generally may adjust the dial to indicate his/her agreement or disagreement with the messaging or other aspects of the presentation. This approach, however, may have several drawbacks. First, the audience response data obtained using the dial-based approach provides linearity in terms of agreement or disagreement of audience members, but the data fails to capture additional emotional responses, such as happiness, sadness, anger, or resentment. Second, in order for the dial-based approach to be effective, audience members must remember to use the dial and adjust it when they experience changes in agreement or disagreement with respect to the messaging presented. In some instances, an audience member may be fully immersed in the presentation and fail to adjust his/her dial. In other instances, an audience member may become disengaged from the presentation and similarly neglect to adjust his/her dial. Finally, due to the cost and maintenance of the dials, the size of the test audience may be limited from a practicality standpoint. As a result, data obtained using the dial-based approach may be misleading depending on the make-up of the test audience.

In other contexts, such as those concerning training presentations, artistic performances, or films, various entities similarly may seek to understand audience response to the underlying content. For example, such entities may request that audience members provide verbal or written feedback concerning the content presented to the audience. This approach, although useful in gaining a general understanding of audience response, may suffer from certain shortcomings. For example, audience feedback may be provided after the conclusion of the presentation, and some audience members may not accurately recall their response to certain portions or aspects of the content. Additionally, certain audience members may not wish to provide detailed feedback on the content or may only provide positive feedback or negative feedback, depending on the entity soliciting such information. Further, in some instances, it may be difficult for certain audience members to accurately reflect on their reaction to portions or aspects of the presented content, or it may be challenging for certain audience members to describe their response to the content in verbal or written form.

In order to effectively create, analyze, or deliver content for presentation to audiences, various entities, such as content creators, analysts, or performers, may desire to obtain accurate and detailed information regarding audience response to the messaging or other aspects of the content presented. However, obtaining such information may be difficult in view of the challenges described above. In particular, it may be difficult to determine the depth of engagement and emotional response of individual audience members at certain points in time during the content presentation as well as changes in the depth of engagement and emotional response throughout the presentation. Additionally, certain entities may desire to use audience response information to identify portions of the content that did or did not result is a desired audience response and determine potential modifications that may improve audience response to the content or related content.

Embodiments of the disclosure may improve accuracy in determining audience response to an overall content presentation and portions thereof as well as an improved level of detail in the audience response data obtained. Certain embodiments may receive a video feed of an audience to which content is presented over a time period. For example, the video feed may be captured using a video camera located in proximity to the audience during the presentation of the content. The audience may include a first audience member (A), a second audience member (B), and any number of additional audience members. Some embodiments may determine a first portion of the video feed corresponding to the first audience member (A) and a second portion of the video feed corresponding to the second audience member (B). For example, the video feed may be partitioned into a number of portions, with each portion of the video feed corresponding to one of the audience members. Certain embodiments may generate a first set of frames using the first portion of the video feed, with the first set of frames including a first frame (A1) corresponding to a first time (T1) during the time period and a second frame (A2) corresponding to a second time (T2) during the time period. For example, the first portion of the video feed may be used to generate respective image frames corresponding to a number of different times during the time period, with each pair of consecutive image frames corresponding to a pair of times that are spaced apart from one another by a common time interval. Some embodiments may determine, using the first frame (A1) and the second frame (A2), a first amount of body movement of the first audience member (A) between the first time (T1) and the second time (T2). For example, the first amount of body movement may be determined by comparing the first frame (A1) and the second frame (A2) and determining an amount of pixel change between the first frame (A1) and the second frame (A2). Certain embodiments may determine, using the first amount of body movement, a first engagement score for the first audience member (A) corresponding to the time interval between the first time (T1) and the second time (T2). Some embodiments may determine a first set of engagement scores for the first audience member (A), with each engagement score being determined using a pair of consecutive frames of the first set of frames. Certain embodiments may determine, using the first frame (A1), a first emotional state classification for the first audience member (A) at the first time (T1). For example, the first emotional state classification may be determined by identifying a first facial expression expressed by the first audience member (A) in the first frame (A1) and assigning the first emotional state classification based at least in part on the first facial expression. In a similar manner, some embodiments may determine, using the second frame (A2), a second emotional state classification for the first audience member (A) at the second time (T2). Certain embodiments may determine a first set of emotional state classifications for the first audience member (A), with each emotional state classification being determined using a single frame of the first set of frames. Some embodiments may determine first aggregate member response data for the first audience member (A), with the first aggregate member response data including the first engagement score, the first emotional state classification, and the second emotional state classification. For example, the first set of engagement scores and the first set of emotional state classifications may be combined to form the first aggregate member response data.

In a similar manner, certain embodiments may generate a second set of frames using the second portion of the video feed, with the second set of frames including a third frame (B1) corresponding to the first time (T1) and a fourth frame (B2) corresponding to the second time (T2). For example, the second portion of the video feed may be used to generate respective image frames corresponding to the same number of different times used in generating the first set of frames, with each pair of consecutive image frames corresponding to a pair of times that are spaced apart from one another by the common time interval. Some embodiments may determine, using the third frame (B1) and the fourth frame (B2), a second amount of body movement of the second audience member (B) between the first time (T1) and the second time (T2). For example, the second amount of body movement may be determined by comparing the third frame (B1) and the fourth frame (B2) and determining an amount of pixel change between the third frame (B1) and the fourth frame (B2). Certain embodiments may determine, using the second amount of body movement, a third engagement score for the second audience member (B) corresponding to the time interval between the first time (T1) and the second time (T2). Some embodiments may determine a second set of engagement scores for the second audience member (B), with each engagement score being determined using a pair of consecutive frames of the second set of frames. Certain embodiments may determine, using the third frame (B1), a third emotional state classification for the second audience member (B) at the first time (T1). For example, the third emotional state classification may be determined by identifying a second facial expression expressed by the second audience member (B) in the third frame (B1) and assigning the third emotional state classification based at least in part on the second facial expression. In a similar manner, some embodiments may determine, using the fourth frame (B2), a fourth emotional state classification for the second audience member (B) at the second time (T2). Certain embodiments may determine a second set of emotional state classifications for the second audience member (B), with each emotional state classification being determined using a single frame of the second set of frames. Some embodiments may determine second aggregate member response data for the second audience member (B), with the second aggregate member response data including the second engagement score, the third emotional state classification, and the fourth emotional state classification. For example, the second set of engagement scores and the second set of emotional state classifications may be combined to form the second aggregate member response data. Certain embodiments may determine aggregate audience response data for the audience, with the aggregate audience response data including the first aggregate member response data and the second aggregate member response data. Some embodiments may similarly determine aggregate member response data for each audience member of the audience and combine the respective aggregate member response data sets to form the aggregate audience response data.

As a result, embodiments of the disclosure may provide improved accuracy in determining audience response to an overall content presentation and portions thereof as well as an improved level of detail in the audience response data obtained. As compared to audience response information derived using existing approaches, the aggregate audience response data obtained using embodiments of the disclosure may provide a higher degree of accuracy and detail with respect to individual audience members. For example, by determining respective engagement scores and emotional state classifications for each audience member throughout the content presentation, embodiments of the disclosure may determine aggregate audience response data that reflects changes in the depth of engagement and emotional response for each audience member during the presentation. Such aggregate audience response data may allow various entities, such as content creators, analysts, or performers, to more effectively understand audience response to the messaging or other aspects of the underlying content. Additionally, embodiments of the disclosure may allow such entities to identify portions of the content that did or did not result is a desired audience response and determine potential modifications that may improve audience response to the content or related content. In some embodiments, determined aggregate audience response data may be used to cause one or more dynamic changes to content that is being streamed or sent to a device for display. For example, alternative endings of content may be dynamically selected and sent to devices based at least in part on aggregate audience response data.

This disclosure relates to, among other things, systems, methods, computer-readable media, techniques, and methodologies for dynamically determining audience response to presented content using a video feed, which may include one or more machine learning models, predictive algorithms, and the like. Embodiments may receive a video feed of an audience to which content is presented over a time period. Embodiments may determine respective portions of the video feed corresponding to different audience members of the audience, with each portion corresponding to only one of the audience members. Embodiments may, for each portion of the video feed, generate a set of frames corresponding to the respective audience member. Embodiments may, for each audience member, determine a set of engagement scores using the respective set of frames. Embodiments may, for each audience member, determine a set of emotional state classifications using the respective set of frames. Embodiments may, for each audience member, determine aggregate member response data that includes the respective set of engagement scores and the respective set of emotional state classifications. Embodiments may determine aggregate audience response data that includes the respective aggregate member response data for each of the audience members.

Referring to FIG. 1A, an example system 100 illustrating dynamically determining audience response to presented content using a video feed is depicted. The system 100 may include one or more servers and at least one or a plurality of user devices that connects to the server. In the example of FIG. 1A, one or more audience response determination servers 110 may be in communication with one or more user devices. Communication between the audience response determination server 110 and the one or more user devices may be facilitated by one or more networks. The one or more user devices may connect to or communicate with the audience response determination server 110, on a regular or irregular basis, to receive content from or deliver content to the audience response determination server 110. In the example of FIG. 1A, one or more content servers 112 also may be in communication with audience response determination server 110 and the one or more user devices. Communication between the content server 112 and the audience response determination server 110 may be facilitated by one or more networks. The one or more user devices may connect to or communicate with the content server 112, on a regular or irregular basis, to receive content from or deliver content to the content server 112. The one or more user devices may be any type of electronic device used by a user to communicate with the audience response determination server 110 and the content server 112.

In the example of FIG. 1A, the content server 112 and the audience response determination server 110 may be in communication with a first user device 122 associated with an audience 102, and a second user device 124 associated with a first user 104. Communication between the website server 112, the audience response determination server 110, and the user devices 122, 124 may be facilitated by one or more network(s) 114. The web site server 112 and the audience response determination server 110 may be in communication with and deliver content to or receive content from any number of user devices associated with any number of audiences or any number of users. In the example of FIG. 1A, the audience 102 may include a first audience member 106, a second audience member 108, and any number of additional audience members. The audience response determination server 110 may use one or more audience response models to determine responses of members of the audience 102 to content presented at the first user device 122. In other words, the audience response determination server 110 may determine audience response of the audience 102 to content presented to the audience 102 via the first user device 122. In some aspects, content 126 may be received from the content server 112 and presented at the first user device 122. In some embodiments, the content 126 may be a visual or auditory performance. For example, the content 126 may be a video of a political speech, as depicted in FIG. 1A. In some embodiments, the content 126 may be presented in a live format. In other embodiments, the content 126 may be presented in a pre-recorded format. In the example of FIG. 1A, the audience response determination server 110 may be in communication with one or more video cameras 128 located in proximity to the audience 102. The video camera 128 may be configured to capture of video feed of the audience 102 throughout presentation of the content 126 at the first user device 122. In some embodiments, the video camera 128 may capture a single video feed of all of the members of the audience 102. In some embodiments, the video camera 128 may capture a video feed of only a portion of the audience 102, such as only the first user 106, and one or more additional video cameras may capture one or more additional video feeds of a remainder of the audience 102.

The audience response determination server 110 may be in communication with one or more databases, which may store information accessible to the audience response determination server 110. In the example of FIG. 1A, the audience response determination server 110 may be in communication with one or more content database(s) 130, one or more video feed database(s) 132, one or more image frame database(s) 134, one or more engagement score database(s) 136, and one or more emotional state database(s) 138. The content database 130 may store content information relating to content presented at the first user device 122, such as the content 126 itself and/or other data relating to the presentation of the content 126. The video feed database 132 may store video feed information relating to the video feed captured by the video camera 128, such as the video feed, timestamps corresponding the video feed, portions of the video feed corresponding to respective members of the audience 102, or other data relating to the video feed captured by the video camera 128. The image frame database 134 may store information relating to sets of image frames generated by the audience response determination server 110 using the video feed, such as sets of image frames corresponding to respective members of the audience 102, timestamps corresponding to the image frames, or other data relating to the sets of image frames. The engagement score database 136 may store information relating to sets of engagement scores determined by the audience response determination server 110 using the sets of image frames, such as sets of engagement scores corresponding to respective members of the audience 102, timestamps corresponding to the engagement scores, or other data relating to the sets of engagement scores. The emotional state database 138 may store information relating to sets of emotional state classifications determined by the audience response determination server 110 using the sets of image frames, such as sets of emotional state classifications corresponding to respective members of the audience 102, timestamps corresponding to the engagement scores, or other data relating to the sets of engagement scores.

To determine a response of the audience 102 to the content 126 presented at the first user device 122, the audience response determination server 110 may execute one or more process flows. For example, an example process flow 140 for dynamically determining audience response to presented content using a video feed is depicted in FIG. 1A.

At block 141 of the process flow 140, the audience response determination server 110 may receive a video feed of an audience to which content is presented over a time period. For example, the audience response determination server 110 may receive a video feed of the audience 102 to which the content 126 is presented over a time period. The video feed may be captured by the video camera 128 and delivered to the audience response determination server 110. In some embodiments, the video feed may be delivered to the audience response determination server 110 in real time. In some embodiments, the video feed may include video footage of all of the members of the audience 102. In some embodiments, the video feed may include video footage of only a portion of the audience 102.

At block 142 of the process flow 140, the audience response determination server 110 may identify a portion of the video feed corresponding to an audience member of the audience. In some embodiments, the audience response determination server 110 may identify respective portions of the video feed corresponding to each audience member of the audience. For example, the audience response determination server 110 may determine a first portion of the video feed corresponding to the first audience member 106 and a second portion of the video feed corresponding to the second audience member 108. The audience response determination server 110 may partition the video feed into respective portions such that each portion of the video feed corresponds to only one member of the audience.

At block 143 of the process flow 140, the audience response determination server 110 may generate a set of image frames for the audience member using the portion of the video feed. In some embodiments, the audience response determination server 110 may generate respective sets of image frames for each audience member using the respective portions of the video feed. For example, the audience response determination server 110 may generate a first set of image frames for the first audience member 106 using the first portion of the video feed and a second set of image frames for the second audience member 108 using the second portion of the video feed. Each set of image frames may be generated by determining image frames at respective time intervals within the time period of the presentation. For example, each set of image frames may include image frames corresponding to one-second intervals within the time period. In other words, each set of image frames may include an image frame for every second of the time period of the presentation, although other time intervals may be used. For example, the first set of image frames for the first audience member 106 may include a first image frame (A1) corresponding to a first time (T1) during the time period and a second image frame (A2) corresponding to a second time (T2) during the time period. Similarly, the second set of image frames for the second audience member 108 may include a third image frame (B1) corresponding to the first time (T1) and a fourth image frame (B2) corresponding to the second time (T2).

At block 144, the audience response determination server 110 may analyze the set of image frames to determine a depth of engagement and an emotional state of the audience member at different times during the presentation. In some embodiments, the audience response determination server 110 may analyze the respective sets of image frames for each audience member to determine a depth of engagement and an emotional state of the audience member at different times during the presentation. For example, the audience response determination server 110 may determine a first set of engagement scores and a first set of emotional state classifications for the first audience member 106 using the first set of image frames. Similarly, the audience response determination server 110 may determine a second set of engagement scores and a second set of emotional state classifications for the second audience member 108 using the second set of image frames.

Each engagement score may be determined using a pair of consecutive image frames of the respective set of image frames. For example, a first engagement score for the first audience member 106 may be determined by comparing the first image frame (A1) and the second image frame (A2), and the first engagement score may correspond to the time interval between the first time (T1) and the second time (T2). Similarly, a second engagement score for the second audience member 108 may be determined by comparing the third image frame (B1) and the fourth image frame (B2), and the second engagement score may correspond to the time interval between the first time (T1) and the second time (T2). In some embodiments, each engagement score may be determined by determining an amount of body movement of the respective audience member, as described below with respect to FIG. 1B.

Each emotional state classification may be determined using a single image frame of the respective set of image frames. For example, a first emotional state classification for the first audience member 106 may be determined by analyzing the first image frame (A1), and a second emotional state classification for the first audience member 106 may be determined by analyzing the second image frame (A2). Similarly, a third emotional state classification for the second audience member 108 may be determined by analyzing the third image frame (B1), and a fourth emotional state classification for the second audience member 108 may be determined by analyzing the fourth image frame (B2). In some embodiments, each emotional state classification may be determined by determining a facial expression expressed by the audience member in the respective image frame, as described below with respect to FIG. 1B.

At block 145, the audience response determination server 110 may combine the set of engagement scores and the set of emotional state classifications for all audience members. For example, the audience response determination server 110 may combine the first set of engagement scores and the first set of emotional state classifications for the first audience member 106 to obtain first aggregate member response data for the first audience member 106. Similarly, the audience response determination server 110 may combine the second set of engagement scores and the second set of emotional state classifications for the second audience member 108 to obtain second aggregate member response data for the second audience member 108. The first aggregate member response data and the second aggregate member response data may be combined, along with aggregate member response data for other members of the audience to obtain aggregate audience response data.

At block 146, the audience response determination server 110 may determine a time during the presentation when the audience had a maximum depth of engagement. For example, the audience response determination server 110 may use the aggregate audience response data to determine an average depth of engagement of the audience at different times during the presentation and compare the average depth of engagement values to determine a time during the presentation when the audience had a maximum depth of engagement. The time when the audience had the maximum depth of engagement may be used to determine a corresponding portion of the content that resulted in the maximum depth of engagement.

Figure 1B:
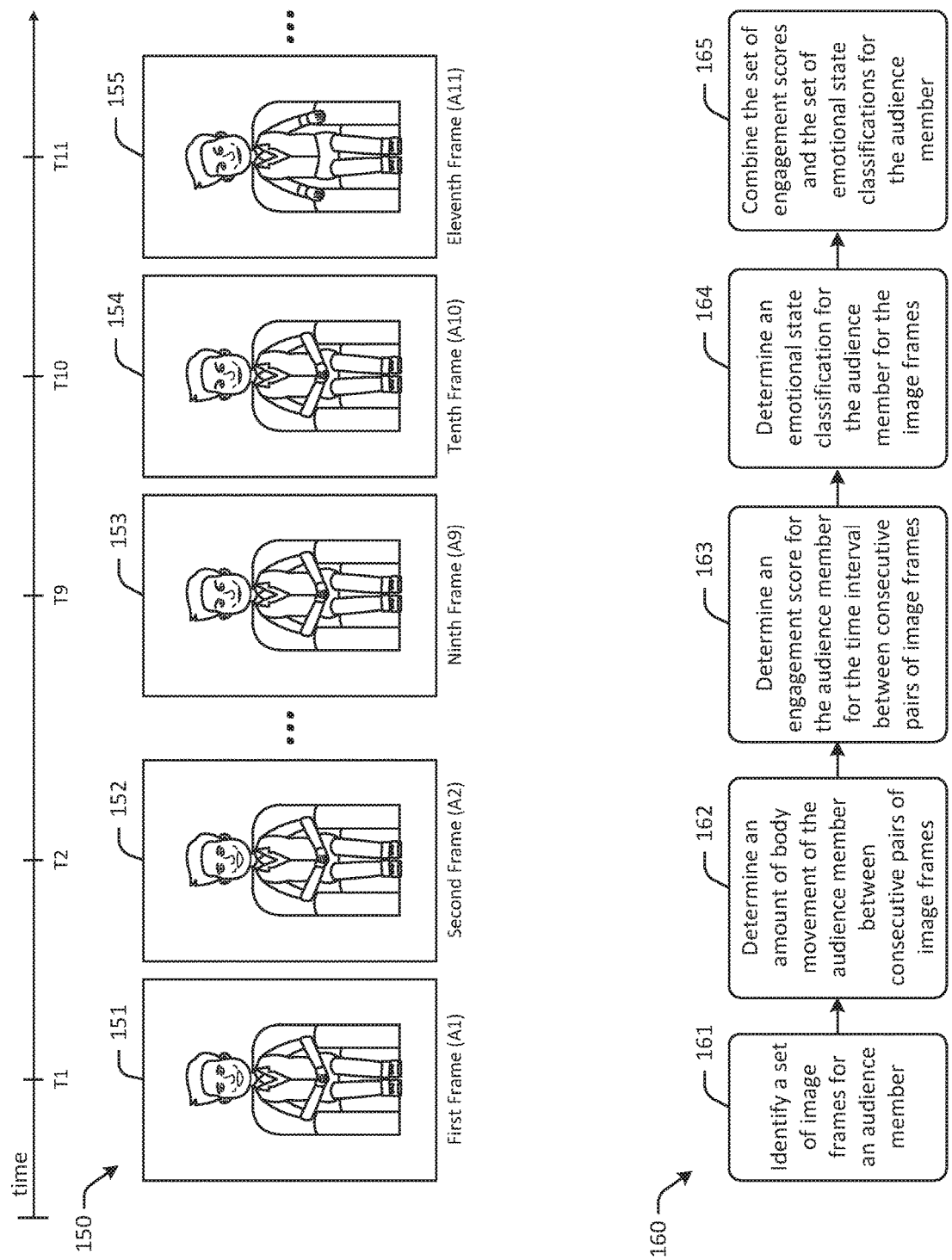
FIG. 1B is a hybrid system and process diagram illustrating dynamically determining audience response to presented content using a video feed in accordance with one or more embodiments of the disclosure.

FIG. 1B depicts the first set of image frames 150 for the first audience member 106. Each image frame of the first set of image frames 150 may correspond to a different time during the time period of the presentation of the content 126. For example, a first image frame 151 may correspond to a first time (T1) during the time period, a second image frame 152 may correspond to a second time (T2) during the time period, a ninth image frame 153 may correspond to a ninth time (T9) during the time period, a tenth image frame 154 may correspond to a tenth time (T10) during the time period, and an eleventh image frame 155 may correspond to an eleventh time (T11) during the time period.

To determine a set of engagement scores and a set of emotional state classifications for a respective audience member of the audience 102, the audience response determination server 110 may execute one or more process flows. For example, an example process flow 160 for determining a set of engagement scores and a set of emotional state classifications for a respective audience member is depicted in FIG. 1B At block 161 of the process flow 160, the audience response determination server 110 may identify a set of image frames for an audience member. For example, the audience response determination server 110 may identify the first set of image frames 150 corresponding to the first audience member 106.

At block 162 of the process flow 160, the audience response determination server 110 may determine an amount of body movement of the audience member between consecutive pairs of image frames of the set of image frames. In some embodiments, the audience response determination server 110 may determine an amount of body movement of the audience member between each consecutive pair of image frames of the set of image frames. For example, the audience response determination server 110 may determine, using the first image frame 151 and the second image frame 152, a first amount of body movement of the first audience member 106 between the first time (T1) and the second time (T2). The amount of body movement may be determined by comparing the first image frame 151 and the second image frame 152. In some embodiments, an amount of pixel change between the first image frame 151 and the second image frame 152 may be determined. For example, the first image frame 151 and the second image frame 152 may be compared on a pixel-by-pixel basis to determine an amount of pixel change between the first image frame 151 and the second image frame 152. In some embodiments, the amount of pixel change may be a numerical value corresponding to a number of pixels of the second image frame 152 that are different from corresponding pixels of the first image frame 151. In some embodiments, the amount of pixel change may be a percentage value corresponding to a number of pixels of the second image frame 152 that are different from corresponding pixels of the first image frame 151, divided by a total number of pixels in each of the first image frame 151 and the second image frame 152. The amount of body movement may be determined using the amount of pixel change. The amount of body movement may be a numerical value or a percentage value. Similarly, the audience response determination server 110 may determine, using the ninth image frame 153 and the tenth image frame 154, an amount of body movement of the first audience member 106 between the ninth time (T9) and the tenth time (T10). Further, the audience response determination server 110 may determine, using the tenth image frame 154 and the eleventh image frame 155, an amount of body movement of the first audience member 106 between the tenth time (T10) and the eleventh time (T11).

At block 163 of the process flow 160, the audience response determination server 110 may determine an engagement score for the audience member for the time interval between consecutive pairs of image frames. In some embodiments, the audience response determination server 110 may determine an engagement score for the audience member for the time interval between each consecutive pair of image frames. For example, the audience response determination server 110 may determine, using the first amount of body movement of the first audience member 106, a first engagement score for the first audience member 106 corresponding to the time interval between the first time (T1) and the second time (T2). Similarly, the audience response determination server 110 may determine, using the amount of body movement of the first audience member 106 between the ninth time (T9) and the tenth time (T10), an engagement score for the first audience member 106 corresponding to the time interval between the ninth time (T9) and the tenth time (T10). In some embodiments, each engagement score may be a numerical value, such as a number between zero (0) and one hundred (100), or a percentage value. In some embodiments, a user engagement model may receive the amount of body movement as input, process the amount of body movement to determine a depth of engagement of the audience member in the presented content during the respective time interval, and output the engagement score for the audience member. In some embodiments, the user engagement model may be a machine-learning model that is trained using a training data set and periodically updated using additional data obtained over time.

At block 164 of the process flow 160, the audience response determination server 110 may determine an emotional state classification for the audience member for the image frames. In some embodiments, the audience response determination server 110 may determine an emotional state classification for the audience member for each image frame of the respective set of image frames. For example, the audience response determination server 110 may determine, using the first image frame 151, a first emotional state classification for the first audience member 106 at the first time (T1). Similarly, the audience response determination server 110 may determine, using the second image frame 152, a second emotional state classification for the first audience member 106 at the second time (T2). In some embodiments, each emotional state classification may be determined by determining a facial expression expressed by the audience member in the respective image frame. For example, an emotional state classification model may receive the respective image frame as input, process the image frame to determine a facial expression expressed by the respective audience member in the image frame, and output the emotional state classification. In some embodiments, the emotional state classification model may be a machine-learning model. In some embodiments, a pattern recognition algorithm may be used to determine a facial expression expressed by an audience member in a particular image frame. In some embodiments, the emotional state classification may be a textual classification. For example, the emotional state classification may be "happy," "sad," "ecstatic," "concerned," or another emotional state experienced by the audience member at the respective time during the content presentation.

At block 165 of the process flow 160, the audience response determination server 110 may combine the set of engagement scores and the set of emotional state classifications for the audience member. For example, the audience response determination server 110 may combine the first set of engagement scores and the first set of emotional state classifications for the first audience member 106.

Figure 1C:
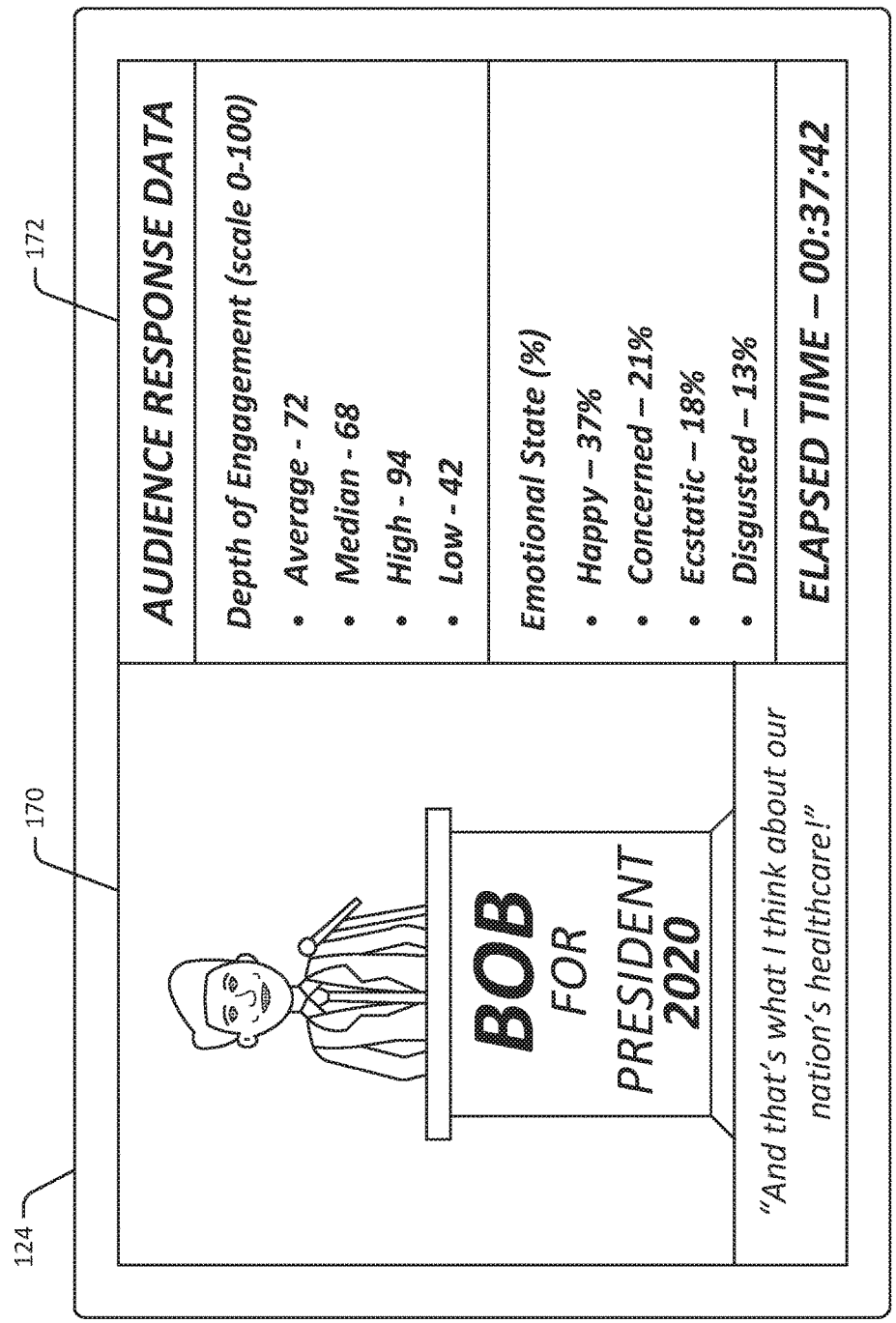
FIG. 1C depicts an example user interface for displaying content and aggregate audience response data in accordance with one or more embodiments of the disclosure.

FIG. 1C depicts an example user interface for displaying portions of content and aggregate audience response data generated by the audience response determination server 110. For example, the user interface may be presented at the second user device 124 for consumption by the user 104. The user interface may include first content 170 and second content 172. In the example of FIG. 1C, the first content 170 may be a portion of the content 126 presented to the audience 102, and the second content 172 may include a portion of the aggregate audience response data corresponding to the first content 170. For example, the first content 170 may be a video clip of the content 126 corresponding to an elapsed time of thirty-seven (37) minutes and forty-two (42) seconds of the presentation of the content 126, and the second content 172 may be a portion of the aggregate audience response data corresponding to the same elapsed time of the presentation of the content 126. In the example of FIG. 1C, the second content 172 may include one or more values corresponding to the depth of engagement of the audience 102 at the elapsed time. For example, the second content 172 may include an average engagement score of the audience 102, a median engagement score of the audience 102, a high engagement score of the audience 102, and a low engagement score of the audience 102. The second content 172 also may include one or more values corresponding to the emotional state classification of members of the audience 102 at the elapsed time. For example, the second content 172 may include one or more top emotional state classifications of the audience and a percentage value corresponding to a percentage of audience members who experienced the one or more top emotional state classifications at the elapsed time of the content presentation.

In some embodiments, the audience response determination server 110 may receive additional input, in addition to the video feed from the video camera 128, for determining audience response of the audience 102 to the content presentation. For example, one or more additional passive data collection devices may be located in proximity to the audience 102 capture additional input. In some embodiments, the one or more passive data collection devices may include one or more heart rate monitors for determining heart rate data for audience members during the content presentation or one or more thermal imaging devices for determining temperature data for audience members during the content presentation. Still other types of passive data collection devices may be used to capture additional data that may be used by the audience response determination server 110 in combination with the video feed to determine audience response.

By implementing the process of receiving a video feed of an audience to which content is presented over a time period, determining respective portions of the video feed corresponding to different audience members of the audience, generating, for each audience member, a set of frames corresponding to the respective audience member, determining, for each audience member, a set of engagement scores using the respective set of frames, determining, for each audience member, a set of emotional state classifications using the respective set of frames, and combining the respective sets of engagement scores and emotional state classifications, embodiments of the disclosure may allow aggregate audience response data to be effectively and accurately determined.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
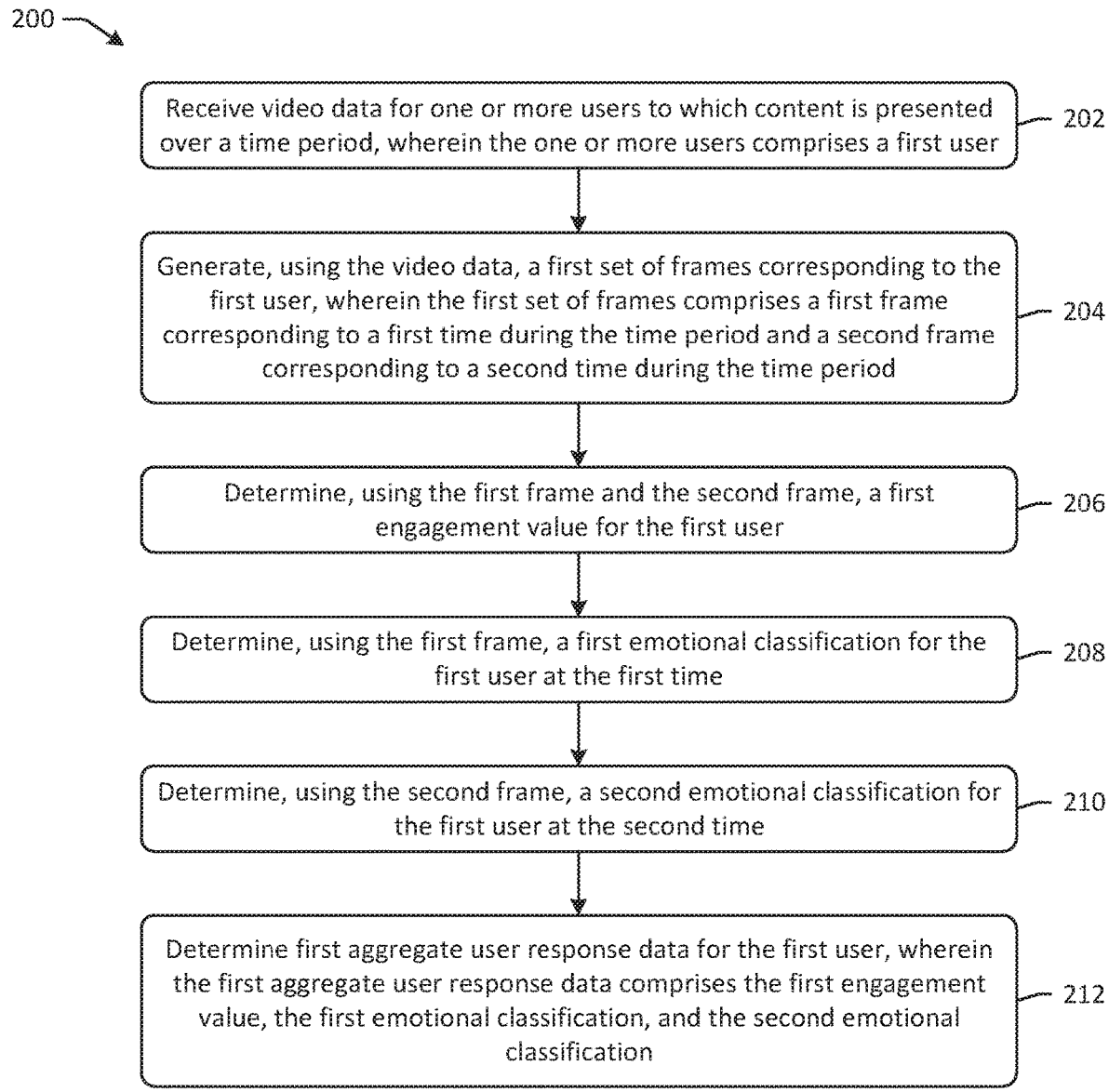
FIG. 2 is an example process flow diagram for dynamically determining audience response to presented content using a video feed in accordance with one or more embodiments of the disclosure.

Referring to FIG. 2, an example process flow 200 for dynamically determining audience response to presented content using a video feed in accordance with one or more embodiments of the disclosure is depicted. Although certain operations are illustrated as occurring separately in FIG. 2, some or all of the operations may occur concurrently or partially concurrently across one or more computer systems. In some embodiments, the operations of the process flow 200 may be executed by a remote server, such as an audience response determination server.

At block 202 of the process flow 200, video data for one or more users to which content is presented over a time period may be received. For example, computer-executable instructions of one or more audience response determination module(s) stored at a server may be executed to receive video data for one or more users to which content is presented over a time period. In some embodiments, a server, such as an audience response determination server, may receive video data of one or more users to which content is presented over a time period. The one or more users may include a first user. The one or more users may include, in addition to the first user, a second user and a third user to which the content is presented over the time period. The one or more users may include any number of users to which the content is presented over the time period. The video data may include one or more video feeds of the one or more users to which the content is presented over the time period. Each video feed may be captured using a video camera in proximity to the one or more users during presentation of the content. In some embodiments, the content may be a visual or auditory performance, such as a political speech, an artistic performance, or a film. Various types of content may be presented to the one or more users in a live or pre-recorded format.

At block 204 of the process flow 200, a first set of frames corresponding to the first user may be generated using the video data. For example, computer-executable instructions of one or more audience response determination module(s) stored at a server may be executed to generate, using the video data, a first set of frames corresponding to the first user. In some embodiments, a server, such as an audience response determination server, may generate, using the video data, a first set of frames corresponding to the first user. The first set of frames may include a first frame corresponding to a first time during the time period and a second frame corresponding to a second time during the time period. The first frame and the second frame may be consecutive frames of the first set of frames. The first set of frames may include, in addition to the first frame and the second frame, a third frame corresponding to a third time during the time period and a fourth frame corresponding to a fourth time during the time period. The first set of frames may include any number of frames corresponding to different times during the time period. In some embodiments, a respective set of frames may be generated for each user of the one or more users.

At block 206 of the process flow 200, a first engagement value for the first user may be determined using the first frame and the second frame. For example, computer-executable instructions of one or more audience response determination module(s) stored at a server may be executed to determine, using the first frame and the second frame, a first engagement value for the first user. In some embodiments, a server, such as an audience response determination server, may determine, using the first frame and the second frame, a first engagement value for the first user. The first engagement value may correspond to the time interval between the first time and the second time. The first engagement value may be determined using the first frame and the second frame. A first amount of body movement of the first user between the first time and the second time may be determined using the first frame and the second frame, and the first engagement value may be determined using the first amount of body movement. In some embodiments, the first amount of body movement may be determined by comparing the first frame and the second frame, and determining an amount of pixel change between the first frame and the second frame. In some embodiments, a set of engagement values for the first user over the time period may be determined using the first set of frames. In some embodiments, each engagement value of the set of engagement values for the first user may be determined using a pair of consecutive frames of the first set of frames. For example, a first engagement value for the first user for the time interval between the first time and the second time may be determined using the first frame and the second frame, and a second engagement value for the first user for the time interval between the second time and the third time may be determined using the second frame and the third frame. In some embodiments, the engagement values may be a numerical value, such as a number between zero (0) and one hundred (100), or a percentage value. In some embodiments, a respective set of engagement values may be determined for each user of the one or more users over the time period.

At block 208 of the process flow 200, a first emotional classification for the first user at the first time may be determined using the first frame. For example, computer-executable instructions of one or more audience response determination module(s) stored at a server may be executed to determine, using the first frame, a first emotional classification for the first user at the first time. In some embodiments, a server, such as an audience response determination server, may determine, using the first frame, a first emotional classification for the first user at the first time. The first emotional classification may correspond to an emotional state of the first user at the first time. For example, the first emotional classification may be "happy," "sad," "ecstatic," "concerned," or another emotional state experienced by the user at the first time. In some embodiments, the first emotional classification may be determined by determining a first facial expression of the first user at the first time using the first frame. For example, an emotional classification model may receive the first frame as input, process the first frame to determine a facial expression expressed by the first user in the first frame, and output the first emotional classification. In some embodiments, the emotional classification model may be a machine-learning model that is trained using a training data set and periodically updated using additional data obtained over time.

At block 210 of the process flow 200, a second emotional classification for the first user at the second time may be determined using the second frame. For example, computer-executable instructions of one or more audience response determination module(s) stored at a server may be executed to determine, using the second frame, a second emotional classification for the first user at the second time. In some embodiments, a server, such as an audience response determination server, may determine, using the second frame, a second emotional classification for the first user at the second time. The second emotional classification may correspond to an emotional state of the first user at the second time. The second emotional classification may be determined in a manner similar to the first emotional classification, as described above. In some embodiments, a set of emotional classifications for the first user at different times during the time period may be determined using the first set of frames. In some embodiments, each emotional classification of the set of emotional classifications for the first user may be determined using a single frame of the first set of frames. For example, in addition to the first emotional classification and the second emotional classification, a third emotional classification for the first user at a third time may be determined using a third frame of the first set of frames, and a fourth emotional classification for the first user at a fourth time may be determined using a fourth frame of the first set of frames. In some embodiments, a respective set of emotional classifications may be determined for each user of the one or more users using the respective set of frames for that user.

At block 212 of the process flow 200, first aggregate user response data for the first user may be determined. For example, computer-executable instructions of one or more audience response determination module(s) stored at a server may be executed to determine first aggregate user response data for the first user. In some embodiments, a server, such as an audience response determination server, may determine first aggregate user response data for the first user. The first aggregate user response data may include the first engagement value, the first emotional classification, and the second emotional classification. In some embodiments, the first aggregate user response data may include the set of engagement values for the first user and the set of emotional classifications for the first user. In some embodiments, respective aggregate user response data may be determined for each user of the one or more users and may include the set of engagement values and the set of emotional classifications for that user.

Figure 3:
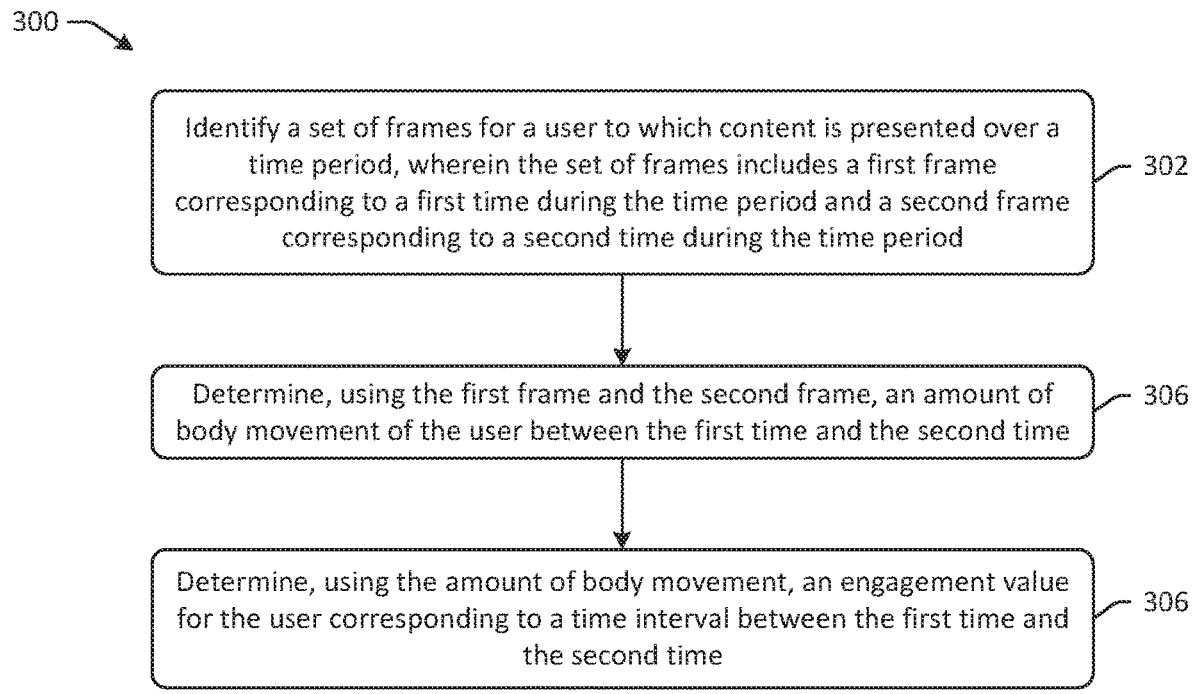
FIG. 3 is an example process flow diagram for determining an engagement value for a user using a frame generated from a video feed in accordance with one or more embodiments of the disclosure.

FIG. 3 depicts an example process flow 300 for determining an engagement value for a user using a frame generated from a video feed in accordance with one or more embodiments of the disclosure. Although certain operations are illustrated as occurring separately in FIG. 3, some or all of the operations may occur concurrently or partially concurrently across one or more computer systems. In some embodiments, the operations of the process flow 300 may be executed by a remote server, such as an audience response determination server.

At block 302 of the process flow 300, a set of frames for a user to which content is presented over a time period may be determined. For example, computer-executable instructions of one or more audience response determination module(s) stored at a server may be executed to determine a set of frames for a user to which content is presented over a time period. In some embodiments, a server, such as an audience response determination server, may determine a set of frames for a user to which content is presented over a time period. The set of frames may include a first frame corresponding to a first time during the time period and a second frame corresponding to a second time during the time period. The set of frames may include any number of frames for the user during the time period, with each frame corresponding to a different time during the time period. The first frame and the second frame may be consecutive frames of the set of frames for the user.

At block 304 of the process flow 300, an amount of body movement of the user between the first time and the second time may be determined using the first frame and the second frame. For example, computer-executable instructions of one or more audience response determination module(s) stored at a server may be executed to determine, using the first frame and the second frame, an amount of body movement of the user between the first time and the second time. In some embodiments, a server, such as an audience response determination server, may determine, using the first frame and the second frame, an amount of body movement of the user between the first time and the second time. The amount of body movement may be determined by comparing the first frame and the second frame. In some embodiments, an amount of pixel change between the first frame and the second frame may be determined. For example, the first frame and the second frame may be compared on a pixel-by-pixel basis to determine an amount of pixel change between the first frame and the second frame. In some embodiments, the amount of pixel change may be a numerical value corresponding to a number of pixels of the second frame that are different from corresponding pixels of the first frame. In some embodiments, the amount of pixel change may be a percentage value corresponding to a number of pixels of the second frame that are different from corresponding pixels of the first frame, divided by a total number of pixels in each of the first frame and the second frame. The amount of body movement may be determined using the amount of pixel change. The amount of body movement may be a numerical value or a percentage value.

At block 306 of the process flow 300, an engagement value for the user corresponding to a time interval between the first time and the second time may be determined using the amount of body movement. For example, computer-executable instructions of one or more audience response determination module(s) stored at a server may be executed to determine, using the amount of body movement, an engagement value for the user corresponding to a time interval between the first time and the second time. In some embodiments, a server, such as an audience response determination server, may determine, using the amount of body movement, an engagement value for the user corresponding to a time interval between the first time and the second time. In some embodiments, the engagement value may be a numerical value, such as a number between zero (0) and one hundred (100), or a percentage value. In some embodiments, a user engagement model may receive the amount of body movement as input, process the amount of body movement to determine a depth of engagement of the user in the presented content during the time interval between the first time and the second time, and output the engagement value for the user. In some embodiments, the user engagement model may be a machine-learning model that is trained using a training data set and periodically updated using additional data obtained over time.

Figure 4A:
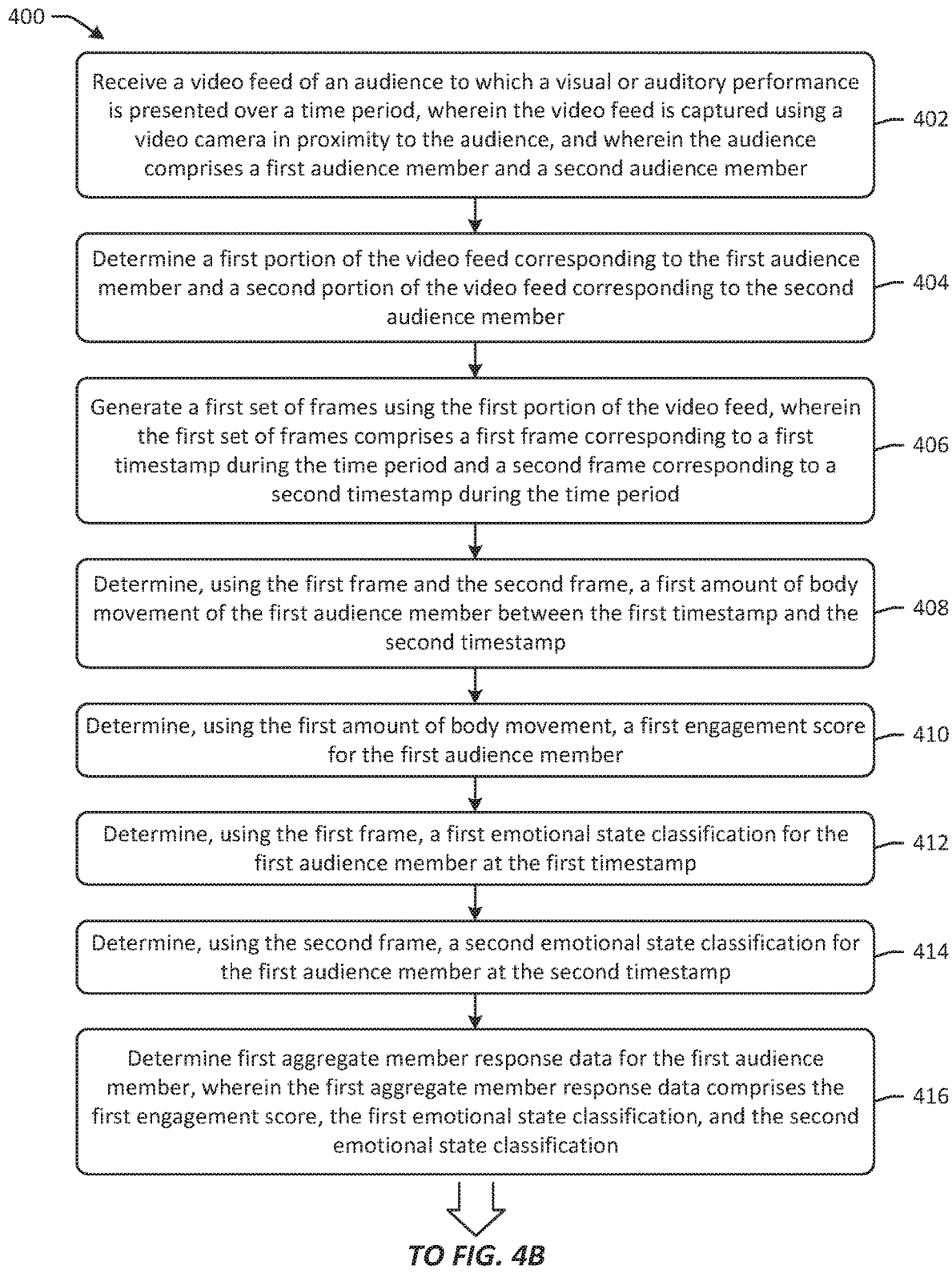
FIGS. 4A and 4B are an example process flow diagram for dynamically determining audience response to presented content using a video feed in accordance with one or more embodiments of the disclosure.
Figure 4B:
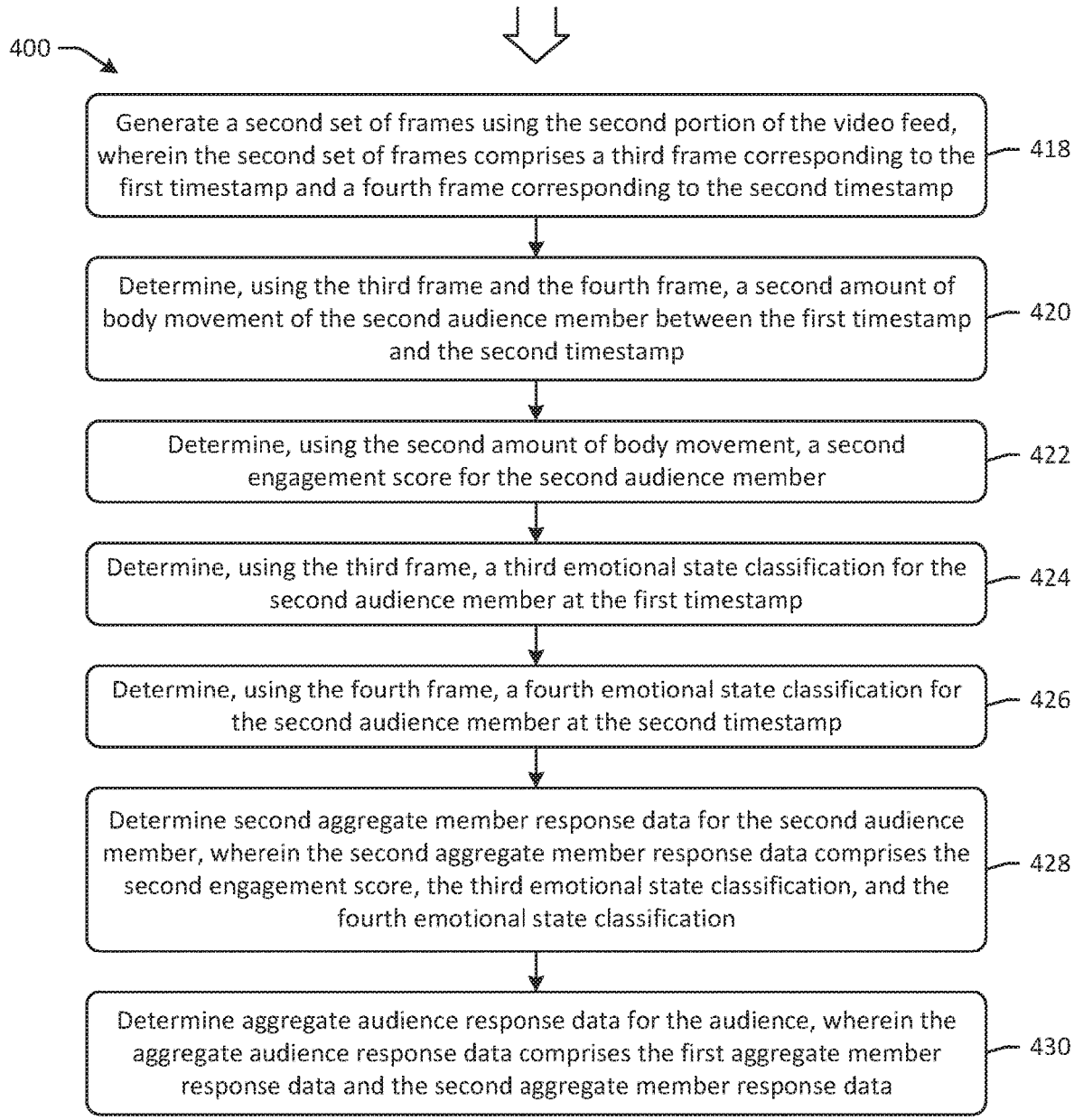

FIGS. 4A and 4B depict an example process flow 400 for dynamically determining audience response to presented content using a video feed in accordance with one or more embodiments of the disclosure. Although certain operations are illustrated as occurring separately in FIGS. 4A and 4B, some or all of the operations may occur concurrently or partially concurrently across one or more computer systems. In some embodiments, the operations of the process flow 400 may be executed by a remote server, such as an audience response determination server.

At block 402 of the process flow 400, a video feed of an audience to which a visual or auditory performance is presented over a time period may be received. For example, computer-executable instructions of one or more audience response determination module(s) stored at a server may be executed to receive a video feed of an audience to which a visual or auditory performance is presented over a time period. The video feed may be captured using a video camera in proximity to the audience, and the video feed may be received from the video camera. In some embodiments, a plurality of video feeds of the audience may be captured using a plurality of video cameras in proximity to the audience. The audience may include a first audience member and a second audience member. The audience may include, in addition to the first audience member and the second audience member, a third audience member and a fourth audience member. The audience may include any number of audience members to which the visual or auditory performance is presented over the time period.

At block 404 of the process flow 400, a first portion of the video feed corresponding to the first audience member and a second portion of the video feed corresponding to the second audience member may be determined. For example, computer-executable instructions of one or more audience response determination module(s) stored at a server may be executed to determine a first portion of the video feed corresponding to the first audience member and a second portion of the video feed corresponding to the second audience member. The first audience member and the second audience member may be within a coverage range of the video camera, and thus the video feed may include footage of the first audience member and the second audience member. The first portion of the video feed may be partitioned from a remainder of the video feed by identifying the first audience member and isolating footage of the first audience member from footage of a reminder of the audience. In a similar manner, the second portion of the video feed may be partitioned from a reminder of the video feed by identifying the second audience member and isolating footage of the second audience member from footage of a remainder of the audience. In some embodiments, respective portions of the video feed corresponding to each audience member of the audience may be determined.

At block 406 of the process flow 400, a first set of frames may be generated using the first portion of the video feed. For example, computer-executable instructions of one or more audience response determination module(s) stored at a server may be executed to generate a first set of frames using the first portion of the video feed. The first set of frames may include a first frame corresponding to a first timestamp during the time period and a second frame corresponding to a second timestamp during the time period. The first set of frames may include any number of frames corresponding to different timestamps during the time period. Each frame of the first set of frames may be an image of the first audience member at the respective timestamp.

At block 408 of the process flow 400, a first amount of body movement of the first audience member between the first timestamp and the second timestamp may be determined using the first frame and the second frame. For example, computer-executable instructions of one or more audience response determination module(s) stored at a server may be executed to determine, using the first frame and the second frame, a first amount of body movement of the first audience member between the first timestamp and the second timestamp. In some embodiments, a first amount of pixel change between the first frame and the second frame may be determined, and the first amount of body movement may be determined using the first amount of pixel change.

At block 410 of the process flow 400, a first engagement score for the first audience member may be determined using the first amount of body movement. For example, computer-executable instructions of one or more audience response determination module(s) stored at a server may be executed to determine, using the first amount of body movement, a first engagement score for the first audience member. The first engagement score may correspond to the time interval between the first timestamp and the second timestamp. In some embodiments, the first engagement score may be a numerical value, such as a number between zero (0) and one hundred (100), or a percentage value. In some embodiments, a user engagement model may receive the first amount of body movement as input, process the first amount of body movement to determine a depth of engagement of the first audience member in the performance during the time interval between the first timestamp and the second timestamp, and output the first engagement score. In some embodiments, the user engagement model may be a machine-learning model.

At block 412 of the process flow 400, a first emotional state classification for the first audience member at the first timestamp may be determined using the first frame. For example, computer-executable instructions of one or more audience response determination module(s) stored at a server may be executed to determine, using the first frame, a first emotional state classification for the first audience member at the first timestamp. The first emotional state classification may correspond to an emotional state of the first audience member at the first timestamp. For example, the first emotional state classification may be "happy," "sad," "ecstatic," "concerned," or another emotional state experienced by the first audience member at the first timestamp. In some embodiments, the first emotional state classification may be determined by determining a first facial expression of the first audience member at the first timestamp using the first frame. For example, an emotional state classification model may receive the first frame as input, process the first frame to determine a facial expression expressed by the first audience member in the first frame, and output the first emotional state classification. In some embodiments, the emotional state classification model may be a machine-learning model.

At block 414 of the process flow 400, a second emotional state classification for the first audience member at the second timestamp may be determined using the second frame. For example, computer-executable instructions of one or more audience response determination module(s) stored at a server may be executed to determine, using the second frame, a second emotional state classification for the first audience member at the second timestamp. The second emotional state classification may be determined in a manner similar to the first emotional state classification, as described above.

At block 416 of the process flow 400, first aggregate member response data for the first audience member may be determined. For example, computer-executable instructions of one or more audience response determination module(s) stored at a server may be executed to determine first aggregate member response data for the first audience member. The first aggregate member response data may include the first engagement score, the first emotional state classification, and the second emotional state classification. In some embodiments, the first aggregate member response data may include a first set of engagement scores for the first audience member, with each engagement score corresponding to a different time interval during the time period, and a first set of emotional state classifications for the first audience member, with each emotional state classification corresponding to a different timestamp during the time period.

At block 418 of the process flow 400, a second set of frames may be generated using the second portion of the video feed. For example, computer-executable instructions of one or more audience response determination module(s) stored at a server may be executed to generate a second set of frames using the second portion of the video feed. The second set of frames may include a third frame corresponding to the first timestamp and a fourth frame corresponding to the second timestamp. The second set of frames may include any number of frames corresponding to different timestamps during the time period. Each frame of the second set of frames may be an image of the second audience member at the respective timestamp.

At block 420 of the process flow 400, a second amount of body movement of the second audience member between the first timestamp and the second timestamp may be determined using the third frame and the fourth frame. For example, computer-executable instructions of one or more audience response determination module(s) stored at a server may be executed to determine, using the third frame and the fourth frame, a second amount of body movement of the second audience member between the first timestamp and the second timestamp.

At block 422 of the process flow 400, a second engagement score for the second audience member may be determined using the second amount of body movement. For example, computer-executable instructions of one or more audience response determination module(s) stored at a server may be executed to determine, using the second amount of body movement, a second engagement score for the second audience member. The second engagement score may correspond to the time interval between the first timestamp and the second timestamp. The second engagement score may be determined in a manner similar to the first engagement score, as described above.

At block 424 of the process flow 400, a third emotional state classification for the second audience member at the first timestamp may be determined using the third frame. For example, computer-executable instructions of one or more audience response determination module(s) stored at a server may be executed to determine, using the third frame, a third emotional state classification for the second audience member at the first timestamp. The third emotional state classification may be determined in a manner similar to the first emotional state classification, as described above.

At block 426 of the process flow 400, a fourth emotional state classification for the second audience member at the second timestamp may be determined using the fourth frame. For example, computer-executable instructions of one or more audience response determination module(s) stored at a server may be executed to determine, using the fourth frame, a fourth emotional state classification for the second audience member at the second timestamp. The fourth emotional state classification may be determined in a manner similar to the first emotional state classification, as described above.

At block 428 of the process flow 400, second aggregate member response data for the second audience member may be determined. For example, computer-executable instructions of one or more audience response determination module(s) stored at a server may be executed to determine second aggregate member response data for the second audience member. The second aggregate member response data may include the second engagement score, the third emotional state classification, and the fourth emotional state classification. In some embodiments, the second aggregate member response data may include a second set of engagement scores for the second audience member, with each engagement score corresponding to a different time interval during the time period, and a second set of emotional state classifications for the second audience member, with each emotional state classification corresponding to a different timestamp during the time period.

At block 430 of the process flow 400, aggregate audience response data for the audience may be determined. For example, computer-executable instructions of one or more audience response determination module(s) stored at a server may be executed to determine aggregate audience response data for the audience. The aggregate audience response data may include the first aggregate member response data and the second aggregate member response data. In some embodiments, the aggregate audience response data may include respective aggregate member response data set for each audience member of the audience, with each aggregate member response data set including a set of engagement scores and a set of emotional state classifications for that audience member.

One or more operations of the method, process flows, or use cases of FIGS. 1-4B may have been described above as being performed by a user device, or more specifically, by one or more program module(s), applications, or the like executing on a device. It should be appreciated, however, that any of the operations of methods, process flows, or use cases of FIGS. 1-4B may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-4B may be described in the context of the illustrative devices, it should be appreciated that such operations may be implemented in connection with numerous other device configurations.

The operations described and depicted in the illustrative methods, process flows, and use cases of FIGS. 1-4B may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-4B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 5:
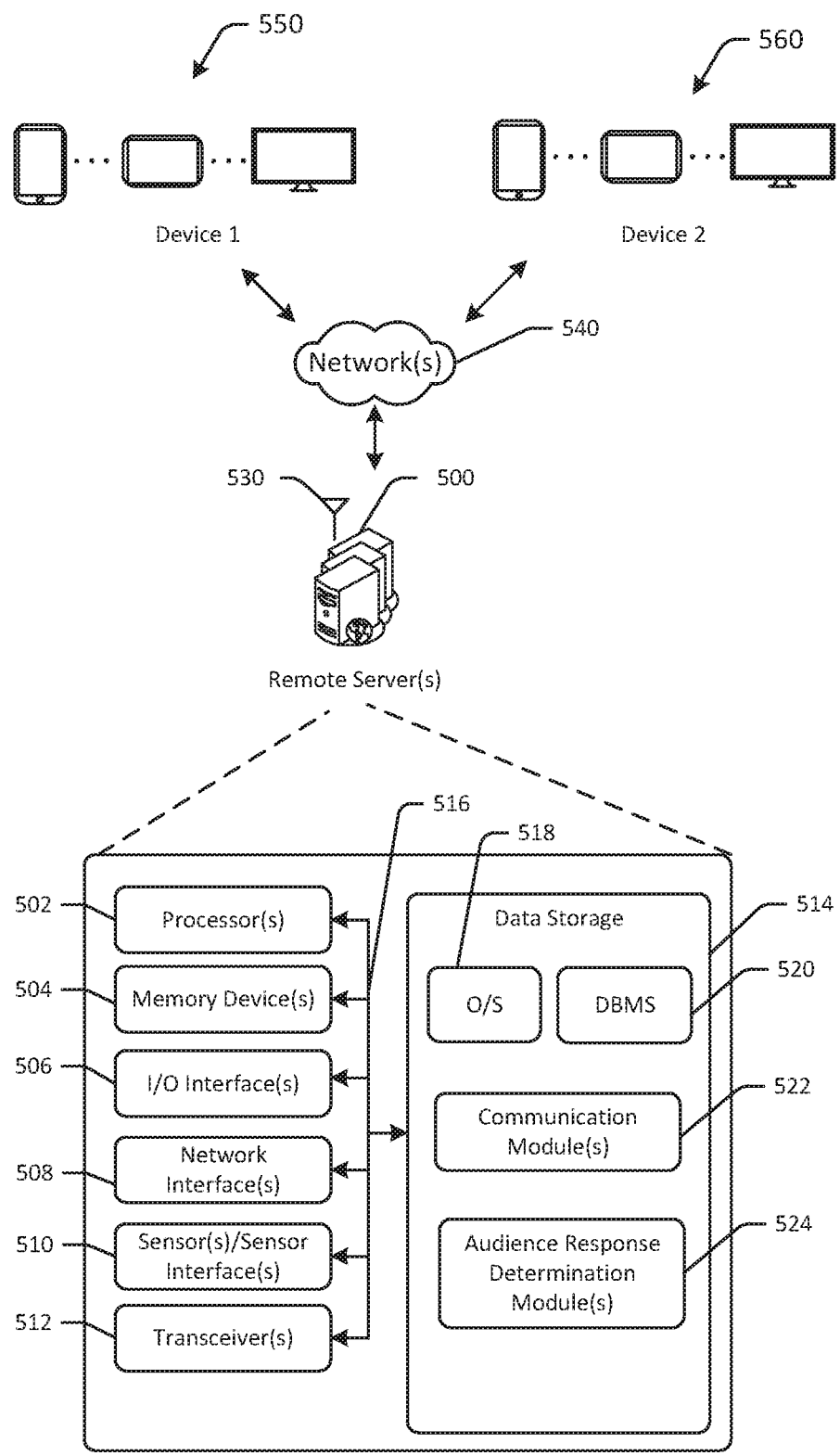
FIG. 5 schematically illustrates an example architecture of a system in accordance with one or more embodiments of the disclosure.

FIG. 5 is a schematic block diagram of one or more illustrative remote server(s) 500 in accordance with one or more example embodiments of the disclosure. The remote server(s) 500 may include any suitable computing device including, but not limited to, a server system, a mobile device such as a smartphone, a tablet, an e-reader, a wearable device, or the like; a desktop computer; a laptop computer; a content streaming device; a set-top box; or the like. The remote server(s) 500 may correspond to an illustrative device configuration for the audience response determination server(s) of FIGS. 1-4B.

The remote server(s) 500 may be configured to communicate via one or more networks with one or more servers, user devices, or the like. The remote server(s) 500 may be configured to manage one or more aspects of a number of content campaigns, such as content delivery parameters, distribution of content for presentation at respective delivery slots at a webpage or in an application, and other operations. The remote server(s) 500 may be configured to deliver or cause delivery of instructions and/or one or more pieces of content and may further be configured to receive a video feed of an audience to which content is presented over a time period, determine respective portions of the video feed corresponding to different audience members of the audience, generate, for each portion of the video feed, a set of frames corresponding to the respective audience member, determine, for each audience member, a set of engagement scores using the respective set of frames, determine, for each audience member, a set of emotional state classifications using the respective set of frames, determine, for each audience member, aggregate member response data that includes the respective set of engagement scores and the respective set of emotional state classifications, and determine aggregate audience response data that includes the respective aggregate member response data for each of the audience members. In some embodiments, a single remote server or single group of remote servers may be configured to perform more than one type of content delivery functionality.

The remote server(s) 500 may be configured to communicate via one or more networks 540. Such network(s) 540 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 540 may have any suitable communication range associated therewith and may include, for example, global networks (e.g., the Internet), metropolitan area networks (MANs), wide area networks (WANs), local area networks (LANs), or personal area networks (PANs). In addition, such network(s) 540 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In FIG. 5, the remote server(s) 500 may communicate with one or more user devices via the network(s) 540. For example, the remote server(s) 500 may communicate with a first user device 550 via the network(s) 540 when the first user device 550 is connected to the network(s) 540. Likewise, the remote server(s) 500 may communicate with a second user device 560 via the network(s) 540 when the second user device 560 is connected to the network(s) 540.

The remote server(s) 500 may communicate with any number of semi-connected devices.

In an illustrative configuration, the remote server(s) 500 may include one or more processors (processor(s)) 502, one or more memory devices 504 (also referred to herein as memory 504), one or more input/output ("I/O") interface(s) 506, one or more network interface(s) 508, one or more sensors or sensor interface(s) 510, one or more transceivers 512, and data storage 514. The remote server(s) 500 may further include one or more buses 516 that functionally couple various components of the remote server(s) 500. The remote server(s) 500 may further include one or more antenna(e) 530 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 516 may include at least one of a system bus, a memory bus, an address bus, or a message bus, and may permit the exchange of information (e.g., data (including computer-executable code), signaling, etc.) between various components of the remote server(s) 500. The bus(es) 516 may include, without limitation, a memory bus or a memory controller, a peripheral bus, an accelerated graphics port, and so forth. The bus(es) 516 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 of the remote server(s) 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 514 may include removable storage and/or non-removable storage including, but not limited to, magnetic storage, optical disk storage, and/or tape storage. The data storage 514 may provide non-volatile storage of computer-executable instructions and other data. The memory 504 and the data storage 514, removable and/or non-removable, are examples of computer-readable storage media (CRSM) as that term is used herein.

The data storage 514 may store computer-executable code, instructions, or the like that may be loadable into the memory 504 and executable by the processor(s) 502 to cause the processor(s) 502 to perform or initiate various operations. The data storage 514 may additionally store data that may be copied to the memory 504 for use by the processor(s) 502 during the execution of the computer-executable instructions. Moreover, output data generated as a result of execution of the computer-executable instructions by the processor(s) 502 may be stored initially in the memory 504, and may ultimately be copied to data storage 514 for non-volatile storage.

More specifically, the data storage 514 may store one or more operating systems (O/S) 518; one or more database management systems (DBMS) 520; and one or more program module(s), applications, engines, computer-executable code, scripts, or the like such as, for example, one or more communication module(s) 522 and/or one or more audience response determination module(s) 524. Some or all of these module(s) may be or include sub-module(s). Any of the components depicted as being stored in data storage 514 may include any combination of software, firmware, and/or hardware. The software and/or firmware may include computer-executable code, instructions, or the like that may be loaded into the memory 504 for execution by one or more of the processor(s) 502. Any of the components depicted as being stored in data storage 514 may support the functionality described in reference to the corresponding components named earlier in this disclosure.

The data storage 514 may further store various types of data utilized by the components of the remote server(s) 500. Any data stored in the data storage 514 may be loaded into the memory 504 for use by the processor(s) 502 in executing computer-executable code. In addition, any data depicted as being stored in the data storage 514 may potentially be stored in one or more datastore(s) and may be accessed via the DBMS 520 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 5, an example datastore(s) may include, for example, content information, video feed information, image frame information, image frame information, engagement score information, emotional state classification information, one or more engagement score models, one or more emotional state classification models, and/or other information.

The processor(s) 502 may be configured to access the memory 504 and execute computer-executable instructions loaded therein. For example, the processor(s) 502 may be configured to execute computer-executable instructions of the various program module(s), applications, engines, or the like of the remote server(s) 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program module(s) depicted in FIG. 5, the communication module(s) 522 may include computer-executable instructions, code, or the like that responsive to execution by one or more of the processor(s) 502 may perform functions including, but not limited to, communicating with remote servers, communicating with remote datastores, communicating with user devices, sending or receiving information and instructions, and the like.

The audience response determination module(s) 524 may include computer-executable instructions, code, or the like that responsive to execution by one or more of the processor (s) 502 may perform functions including, but not limited to, receiving a video feed of an audience to which content is presented over a time period, determining respective portions of the video feed corresponding to different audience members of the audience, generating, for each audience member, a set of frames corresponding to the respective audience member, determining, for each audience member, a set of engagement scores using the respective set of frames, determining, for each audience member, a set of emotional state classifications using the respective set of frames, and combining the respective sets of engagement scores and emotional state classifications.

Referring now to other illustrative components depicted as being stored in the data storage 514, the O/S 518 may be loaded from the data storage 514 into the memory 504 and may provide an interface between other application software executing on the remote server(s) 500 and the hardware resources of the remote server(s) 500. More specifically, the O/S 518 may include a set of computer-executable instructions for managing the hardware resources of the remote server(s) 500 and for providing common services to other application programs (e.g., managing memory allocation among various application programs). In certain example embodiments, the O/S 518 may control execution of the other program module(s) to dynamically enhance characters for content rendering. The O/S 518 may include any operating system now known or which may be developed in the future including, but not limited to, any server operating system, any mainframe operating system, or any other proprietary or non-proprietary operating system.

The DBMS 520 may be loaded into the memory 504 and may support functionality for accessing, retrieving, storing, and/or manipulating data stored in the memory 504 and/or data stored in the data storage 514. The DBMS 520 may use any of a variety of database models (e.g., relational model, object model, etc.) and may support any of a variety of query languages. The DBMS 520 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server(s) 500 is a mobile device, the DBMS 520 may be any suitable light-weight DBMS optimized for performance on a mobile device.

Referring now to other illustrative components of the remote server(s) 500, the input/output (I/O) interface(s) 506 may facilitate the receipt of input information by the remote server(s) 500 from one or more I/O devices as well as the output of information from the remote server(s) 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server(s) 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna(e) 530 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, a WiMAX network, a 3G network, etc.

The remote server(s) 500 may further include one or more network interface(s) 508 via which the remote server(s) 500 may communicate with any of a variety of other systems, platforms, networks, devices, and so forth. The network interface(s) 508 may enable communication, for example, with one or more wireless routers, one or more host servers, one or more web servers, and the like via one or more networks.

The antenna(e) 530 may include any suitable type of antenna depending, for example, on the communications protocols used to transmit or receive signals via the antenna (e) 530. Non-limiting examples of suitable antennae may include directional antennae, non-directional antennae, dipole antennae, folded dipole antennae, patch antennae, multiple-input multiple-output (MIMO) antennae, or the like. The antenna(e) 530 may be communicatively coupled to one or more transceivers 512 or radio components to which or from which signals may be transmitted or received.

As previously described, the antenna(e) 530 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 530 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 530 may be configured to transmit or receive radio frequency signals within any suitable frequency range forming part of the unlicensed portion of the radio spectrum.

The antenna(e) 530 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna(e) 530—transmitting or receiving radio frequency (RF) signals in the bandwidth and/or channels corresponding to the communications protocols utilized by the remote server(s) 500 to communicate with other devices. The transceiver(s) 512 may include hardware, software, and/or firmware for modulating, transmitting, or receiving—potentially in cooperation with any of antenna(e) 530—communications signals according to any of the communications protocols discussed above including, but not limited to, one or more Wi-Fi and/or Wi-Fi direct protocols, as standardized by the IEEE 1002.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the remote server(s) 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 5 as being stored in the data storage 514 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server(s) 500, and/or hosted on other computing device(s) accessible via one or more networks, may be provided to support the functionality provided by the program module(s), applications, or computer-executable code depicted in FIG. 5 and/or additional or alternate functionality. Further, functionality may be modularized differently such that processing described as being supported collectively by the collection of program module(s) depicted in FIG. 5 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 5 may be implemented, at least partially, in hardware and/or firmware across any number of devices.

It should further be appreciated that the remote server(s) 500 may include alternate and/or additional hardware, software, or firmware components beyond those described or depicted without departing from the scope of the disclosure. More particularly, it should be appreciated that software, firmware, or hardware components depicted as forming part of the remote server(s) 500 are merely illustrative and that some components may not be present or additional components may be provided in various embodiments. While various illustrative program module(s) have been depicted and described as software module(s) stored in the data storage 514, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment. The term "based at least in part on" and "based on" are synonymous terms which may be used interchangeably herein.

That which is claimed is:

1. A method comprising:
   receiving, by one or more computer processors coupled to at least one memory, a first video feed comprising video data representing an audience to which a visual or auditory performance is presented over a time period, and wherein the first video feed is captured using a video camera in proximity to the audience, and wherein the video data comprises first video frames;
   partitioning the first video frames into a first plurality of portions and a second plurality of portions, the first plurality of portions comprising a first portion of a first video frame of the first video frames and a first portion of a second video frame of the first video frames, the second plurality of portions comprising a second portion of the first video frame and a second portion of the second video frame, the first portion of the first video frame and the first portion of the second video frame each representing a first separate single member of the audience, the second portion of the first video frame and the second portion of the second video frame each representing a second separate single member of the audience;

generating a second video feed comprising the first plurality of portions, the second video feed corresponding to the first separate single member, wherein the first plurality of portions comprises a third video frame comprising the first portion of the first video frame and corresponding to a first timestamp during the time period, and a fourth video frame comprising the first portion of the second video frame and corresponding to a second timestamp during the time period;

generating a third video feed comprising the second plurality of portions, the third video feed corresponding to the second separate single member, wherein the second plurality of portions comprises a fifth video frame comprising the second portion of the first video frame and corresponding to the first timestamp, and a sixth video frame comprising the second portion of the second video frame and corresponding to the second timestamp;

determining, using the third video frame and the fourth video frame, a first amount of body movement of the first separate single member between the first timestamp and the second timestamp;

determining, using the first amount of body movement, a first engagement score for the first separate single member;

determining, using the third video frame, a first emotional state classification for the first separate single member at the first timestamp;

determining, using the fourth video frame, a second emotional state classification for the first separate single member at the second timestamp;

determining first aggregate member response data for the first separate single member, wherein the first aggregate member response data comprises the first engagement score, the first emotional state classification, and the second emotional state classification;

determining, using the fifth video frame and the sixth video frame, a second amount of body movement of the second separate single member between the first timestamp and the second timestamp;

determining, using the second amount of body movement, a second engagement score for the second separate single member;

determining, using the fifth video frame, a third emotional state classification for the second separate single member at the first timestamp;

determining, using the sixth video frame, a fourth emotional state classification for the second separate single member at the second timestamp;

determining second aggregate member response data for the second separate single member, wherein the second aggregate member response data comprises the second engagement score, the third emotional state classification, and the fourth emotional state classification; and determining aggregate audience response data for the audience, wherein the aggregate audience response data comprises the first aggregate member response data and the second aggregate member response data.

2. The method of claim 1, wherein the first engagement score is a numerical value or a percentage value, and wherein determining the first amount of body movement of the first separate single member between the first timestamp and the second timestamp comprises:

comparing pixels of the third video frame and corresponding pixels of the fourth video frame; and determining an amount of pixel change between the third video frame and the fourth video frame, wherein the amount of pixel change comprises one of: (i) a numerical value corresponding to a number of pixels of the fourth video frame that are different from corresponding pixels of the third video frame; or (ii) a percentage value corresponding to the number of pixels of the fourth video frame that are different from corresponding pixels of the third video frame, divided by a total number of pixels in each of the third video frame and the fourth video frame.

3. The method of claim 1, wherein the first emotional state classification and the second emotional state classification are textual values, wherein determining the first emotional state classification for the first separate single member at the first timestamp comprises determining, using a pattern recognition algorithm, a first facial expression of the first separate single member at the first timestamp using the third video frame, and wherein determining the second emotional state classification for the first separate single member at the second timestamp comprises determining, using the pattern recognition algorithm, a second facial expression of the first separate single member at the second timestamp using the fourth video frame.

4. The method of claim 1, further comprising:

determining, using the first engagement score and the second engagement score, an average audience engagement score for the audience for a time interval between the first timestamp and the second timestamp;

determining that the average audience engagement score is a maximum audience engagement score for the audience during the time period; and causing a presentation of the average audience engagement score and a portion of the visual or auditory performance corresponding to the time interval between the first timestamp and the second timestamp at a user device.

5. A method comprising:

receiving, by one or more computer processors coupled to at least one memory, a first video feed comprising video data representing a plurality of users to which content is presented over a time period, the video data comprising first video frames;

partitioning the first video frames into a plurality of portions, the plurality of portions comprising a portion of a first video frame of the first video frames and a portion of a second video frame of the first video frames, the portion of the first video frame and the portion of the second video frame representing a separate single user of the plurality of users;

generating, a second video feed comprising the plurality of portions, the second video feed corresponding to the separate single user, wherein the plurality of portions comprises a third video frame comprising the portion of the first video frame and corresponding to a first time during the time period, and a fourth video frame comprising the portion of the second video frame and corresponding to a second time during the time period;

determining, using the third video frame and the fourth video frame, a first engagement value for the separate single user;

determining, using the third video frame, a first emotional classification for the separate single user at the first time;

determining, using the fourth video frame, a second emotional classification for the separate single user at the second time; and determining first aggregate user response data for the separate single user, wherein the first aggregate user response data comprises the first engagement value, the first emotional classification, and the second emotional classification.

6. The method of claim 5, wherein the first engagement value is a numerical value or a percentage value, and wherein determining the first engagement value for the separate single user comprises:

determining, using the third video frame and the fourth video frame, a first amount of body movement of the separate single user between the first time and the second time; and determining the first engagement value using the first amount of body movement.

7. The method of claim 6, wherein determining the first amount of body movement of the separate single user between the first time and the second time comprises:

comparing the third video frame and the fourth video frame; and determining an amount of pixel change between the third video frame and the fourth video frame, wherein the amount of pixel change comprises one of: (i) a numerical value corresponding to a number of pixels of the fourth video frame that are different from corresponding pixels of the third video frame; or (ii) a percentage value corresponding to the number of pixels of the fourth video frame that are different from corresponding pixels of the third video frame, divided by a total number of pixels in each of the third video frame and the fourth video frame.

8. The method of claim 5, wherein determining the first emotional classification for the separate single user at the first time comprises determining a first facial expression of the separate single user at the first time using the third video frame, and wherein determining the second emotional classification for the separate single user at the second time comprises determining a second facial expression of the separate single user at the second time using the fourth video frame.

9. The method of claim 5, wherein the plurality of portions further comprises a fifth video frame corresponding to a third time during the time period, the method further comprising:

determining, using the fourth video frame and the fifth video frame, a second engagement value for the separate single user; and determining, using the fifth video frame, a third emotional classification for the separate single user at the third time.

10. The method of claim 5, wherein the plurality of users further comprises a second separate single user, and wherein the plurality of portions further comprises a second portion of the first video frame and a second portion of the second video frame, the second portion of the first video frame and the second portion of the second video frame representing the second separate single user, the method further comprising:

generating, using the second portion of the first video frame, a third video feed corresponding to the second separate single user, wherein the third video feed comprises a fifth video frame comprising the second portion of the first video frame and corresponding to the first time, and a sixth video frame comprising the second portion of the second video frame and corresponding to the second time;

determining, using the fifth video frame and the sixth video frame, a second engagement value for the second separate single user;

determining, using the fifth video frame, a third emotional classification for the second separate single user at the first time;

determining, using the sixth video frame, a fourth emotional classification for the second separate single user at the second time; and determining second aggregate user response data for the second separate single user, wherein the second aggregate user response data comprises the second engagement value, the third emotional classification, and the fourth emotional classification.

11. The method of claim 10, further comprising:

determining, using the first engagement value and the second engagement value, an average engagement value for the plurality of users; and causing a presentation of the average engagement value and a portion of the content corresponding to the second time at a user device.

12. The method of claim 10, further comprising:

determining, using the second emotional classification and the fourth emotional classification, a top emotional classification for the plurality of users at the second time; and causing a presentation of the top emotional classification and a portion of the content corresponding to the second time at a user device.

13. The method of claim 5, wherein the time period is a first time period, the method further comprising:

receiving a third video feed comprising video data representing one or more additional users to which the content is presented over a second time period, wherein the one or more additional users comprises a second separate single user, and wherein the second time period is after the first time period;

generating a fourth video feed corresponding to the second separate single user, wherein the fourth video feed comprises a fifth video frame corresponding to a third time during the second time period and a sixth video frame corresponding to a fourth time during the second time period;

determining, using the fifth video frame and the sixth video frame, a second engagement value for the second separate single user;

determining, using the fifth video frame, a third emotional classification for the second separate single user at the third time;

determining, using the sixth video frame, a fourth emotional classification for the second separate single user at the fourth time; and determining second aggregate user response data for the second separate single user, wherein the second aggregate user response data comprises the second engagement value, the third emotional classification, and the fourth emotional classification.

14. The method of claim 13, further comprising:

syncing the first aggregate user response data and the second aggregate user response data to the content using an elapsed time of the content, wherein the first time and the third time correspond to a first elapsed time of the content, and wherein the second time and the fourth time correspond to a second elapsed time of the content.

15. A device comprising:
at least one memory that stores computer-executable instructions; and
at least one processor configured to access the at least one memory and execute the computer-executable instructions to:
 receive, by one or more computer processors coupled to at least one memory, a first video feed comprising video data representing a plurality of users to which content is presented over a time period, the video data comprising first video frames;
 partition the first video frames into a plurality of portions, the plurality of portions comprising a portion of a first video frame of the first video frames and a portion of a second video frame of the first video frames, the portion of the first video frame and the portion of the second video frame representing a first user of the plurality of users;
 generate a second video feed comprising the plurality of portions, the second video feed corresponding to the first user, wherein the plurality of portions comprises a third video frame comprising the portion of the first video frame and corresponding to a first time during the time period, and a fourth video frame comprising the portion of the second video frame and corresponding to a second time during the time period;
 determine, using the third video frame and the fourth video frame, a first engagement value for the first user;
 determine, using the third video frame, a first emotional classification for the first user at the first time;
 determine, using the fourth video frame, a second emotional classification for the first user at the second time; and
 determine first aggregate user response data for the first user, wherein the first aggregate user response data comprises the first engagement value, the first emotional classification, and the second emotional classification.

16. The device of claim 15, wherein the plurality of users further comprises a second user, wherein the plurality of portions further comprises a second portion of first video frame and a second portion of the second video frame, the second portion of the first video frame and the second portion of the second video frame representing the second user, and wherein the at least one processor is further configured to access the at least one memory and execute the computer-executable instructions to:
 generate, using the second portion of the first video frame, a third video feed corresponding to the second user, wherein the third video feed comprises a fifth video frame comprising the second portion of the first video frame and corresponding to the first time, and a sixth video frame comprising the second portion of the second video frame and corresponding to the second time;
 determine, using the fifth video frame and the sixth video frame, a second engagement value for the second user;
 determine, using the fifth video frame, a third emotional classification for the second user at the first time;
 determine, using the sixth video frame, a fourth emotional classification for the second user at the second time; and
 determine second aggregate user response data for the second user, wherein the second aggregate user response data comprises the second engagement value, the third emotional classification, and the fourth emotional classification.

17. The device of claim 16, wherein the at least one processor is further configured to access the at least one memory and execute the computer-executable instructions to:
 determine, using the first engagement value and the second engagement value, an average engagement value for the plurality of users;
 determine, using the second emotional classification and the fourth emotional classification, a top emotional classification for the plurality of users at the second time; and
 cause a presentation of the average engagement value, the top emotional classification, and a portion of the content corresponding to the second time at a user device.

18. The device of claim 15, wherein the time period is a first time period, and wherein the at least one processor is further configured to access the at least one memory and execute the computer-executable instructions to:
 receive a third video feed comprising video data representing one or more additional users to which the content is presented over a second time period, wherein the one or more additional users comprises a second user, and wherein the second time period is after the first time period;
 generate a fourth video feed corresponding to the second user, wherein the fourth video feed comprises a fifth video frame corresponding to a third time during the second time period and a sixth video frame corresponding to a fourth time during the second time period;
 determine, using the fifth video frame and the sixth video frame, a second engagement value for the second user;
 determine, using the fifth video frame, a third emotional classification for the second user at the third time;
 determine, using the sixth video frame, a fourth emotional classification for the second user at the fourth time;
 determine second aggregate user response data for the second user, wherein the second aggregate user response data comprises the second engagement value, the third emotional classification, and the fourth emotional classification; and
 sync the first aggregate user response data and the second aggregate user response data to the content using an elapsed time of the content, wherein the first time and the third time correspond to a first elapsed time of the content, and wherein the second time and the fourth time correspond to a second elapsed time of the content.

* * * * *